US007196326B2

(12) United States Patent
Franzen et al.

(10) Patent No.: US 7,196,326 B2

(45) Date of Patent: Mar. 27, 2007

(54) MASS SPECTROMETER AND REACTION CELL FOR ION-ION REACTIONS

(75) Inventors: Jochen Franzen, Bremen (DE); Evgenij Nikolaev, Moscow (RU)

(73) Assignee: Bruker Daltonik GmbH, Bremen (DE)

( * ) Notice: Subject to any disclaimer, the term of this patent is extended or adjusted under 35 U.S.C. 154(b) by 0 days.

(21) Appl. No.: 11/149,952

(22) Filed: Jun. 10, 2005

(65) Prior Publication Data

US 2005/0279931 A1 Dec. 22, 2005

(30) Foreign Application Priority Data

Jun. 11, 2004 (DE) ..................... 10 2004 028 419

(51) Int. Cl.
*B01D 59/44* (2006.01)
*H01J 49/42* (2006.01)
*H01J 49/04* (2006.01)

(52) U.S. Cl. ....................... 250/288; 250/292; 250/293

(58) Field of Classification Search ................. 250/288
See application file for complete search history.

(56) References Cited

U.S. PATENT DOCUMENTS

| | | | | |
|---|---|---|---|---|
| 4,511,889 | A * | 4/1985 | Atwater | 340/629 |
| 5,811,800 | A * | 9/1998 | Franzen et al. | 250/288 |
| 6,107,628 | A * | 8/2000 | Smith et al. | 250/292 |
| 6,559,444 | B2 * | 5/2003 | Franzen | 250/293 |
| 6,642,514 | B2 * | 11/2003 | Bateman et al. | 250/288 |
| 6,649,908 | B2 * | 11/2003 | Apffel et al. | 250/288 |
| 6,649,909 | B2 * | 11/2003 | Russ et al. | 250/288 |
| 6,700,117 | B2 * | 3/2004 | Franzen | 250/287 |
| 6,737,641 | B2 * | 5/2004 | Kato | 250/281 |
| 6,781,117 | B1 * | 8/2004 | Willoughby et al. | 250/281 |
| 6,828,551 | B2 * | 12/2004 | Kato | 250/281 |
| 6,849,848 | B2 * | 2/2005 | Baranov et al. | 250/288 |
| 7,022,981 | B2 * | 4/2006 | Kato | 250/288 |
| 7,026,610 | B2 * | 4/2006 | Kato | 250/285 |
| 2003/0052269 | A1 | 3/2003 | Apffel, Jr. et al. | |
| 2003/0155498 | A1 * | 8/2003 | Kato | 250/281 |
| 2003/0155505 | A1 | 8/2003 | Russ et al. | |
| 2004/0069943 | A1 * | 4/2004 | Kato | 250/281 |
| 2004/0089802 | A1 | 5/2004 | Kato | |
| 2004/0238754 | A1 * | 12/2004 | Baranov et al. | 250/423 R |

(Continued)

FOREIGN PATENT DOCUMENTS

DE 19523859 A1 1/1997

(Continued)

*Primary Examiner*—Nikita Wells
*Assistant Examiner*—Bernard Souw
(74) *Attorney, Agent, or Firm*—Law Offices of Paul E. Kudirka

(57) ABSTRACT

The invention relates to a reaction cell for reactions between different types of ion species and a related mass spectrometer to analyze the ion products. The invention consists in an RF-operated straight ion guide with a side inlet, particularly suitable for reactions between positive and negative ion species, one ion species being fed in through the side inlet. Particularly favorable is an ion guide made up of a set of coaxial apertured diaphragms with a slight axial potential gradient. The reactions can be used for a fragmentation of multiply charged protein or peptide ions by electron transfer, or for the removal of excess charges of multiply charged biopolymer ions, for example.

17 Claims, 3 Drawing Sheets

U.S. PATENT DOCUMENTS

Figure 1:
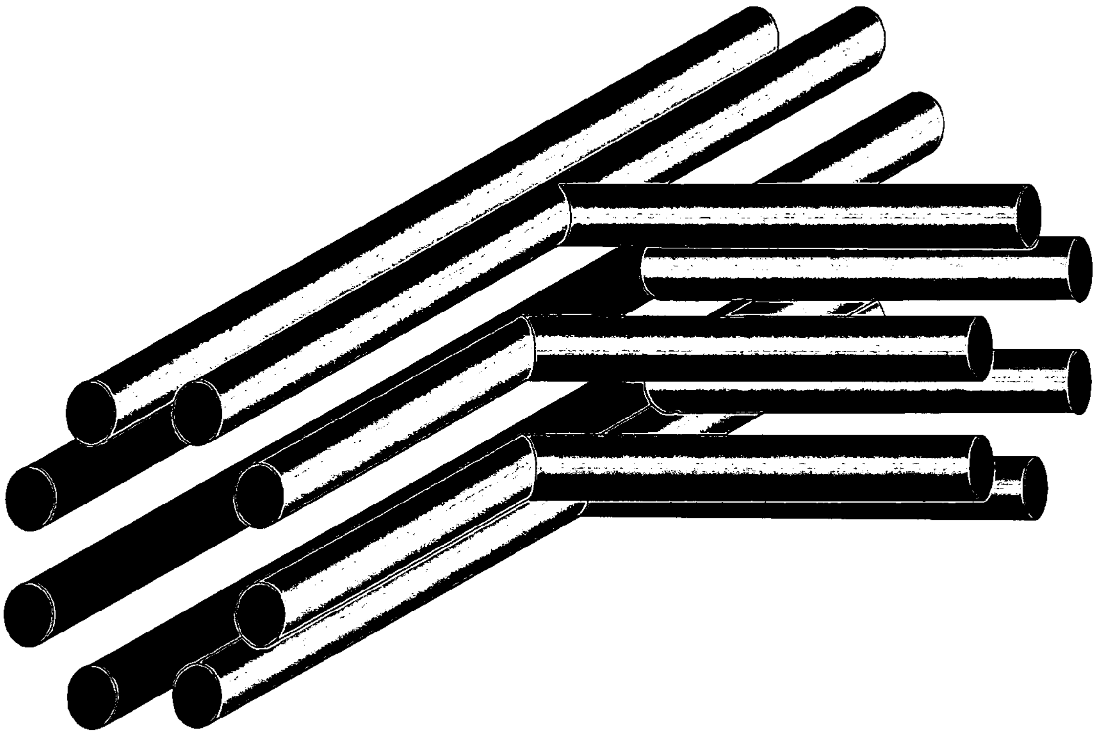

| | | | | |
|---|---|---|---|---|
| 2004/0262511 | A1 * | 12/2004 | Kato | 250/281 |
| 2005/0279931 | A1 * | 12/2005 | Franzen et al. | 250/290 |
| 2006/0076485 | A1 * | 4/2006 | Stoermer et al. | 250/290 |
| 2006/0186331 | A1 * | 8/2006 | Hartmer et al. | 250/288 |

FOREIGN PATENT DOCUMENTS

| | | | |
|---|---|---|---|
| EP | 1 339 088 | A2 | 8/2003 |
| EP | 1339088 | A2 | 8/2003 |
| GB | 2362259 | A | 11/2001 |
| GB | 2 392 005 | A | 2/2004 |
| WO | WO 00/63949 | A1 | 10/2000 |
| WO | WO 03/102545 | A3 | 11/2003 |

* cited by examiner

MASS SPECTROMETER AND REACTION CELL FOR ION-ION REACTIONS

FIELD OF THE INVENTION

The invention relates to a reaction cell for reactions between different types of ion species and a mass spectrometer to analyze the ion products.

BACKGROUND OF THE INVENTION

New methods for fragmenting biopolymer molecules, mainly peptides and proteins, have recently been developed for use in ion cyclotron resonance or Fourier transforms mass spectrometry (ICR-MS or FTMS). They consist in allowing multiply charged ions to react with electrons, resulting in the fragmentation of the chain-shaped molecules. If one begins with positive ions that are charged by attachment of a few protons, then the neutralization energy of the first proton released in the process leads to the fragmentation of the chain molecules at the precise location where the proton was localized. The method is known as "electron capture dissociation" (ECD for short). If the molecules were originally doubly charged, one of the two fragments created remains as an ion. The fragmentation of proteins and peptides, in particular, follows very simple rules in this process (for specialists: there are predominantly c cleavages, which lead to relatively high ion signals, and only a small number of a and z cleavages between the amino acids of a peptide), so that it is relatively simple to draw conclusions about the amino acid sequence from the fragment ion spectrum. It is significantly easier to interpret these ECD fragment spectra than it is to interpret fragment spectra produced by collision induced dissociation (CID).

For a fragmentation by electron capture, the kinetic energy of the electrons must be low, as otherwise no capture can take place. In practice one supplies electrons with an energy of only a few electron-volts (eV). This procedure is very easy in the extremely strong magnetic fields of the Fourier transform mass spectrometer because the electrons originate from a flat thermion cathode and simply drift along the magnetic field lines with only very low acceleration until they reach the cloud of ions. A second type of electron capture is possible with electrons having a kinetic energy of some 10 to 30 electron-volts (eV). This is termed "hot electron capture dissociation", or "hot ECD" for short. It results in very similar fragmentation.

It is also possible to fragment triply or multiply charged positive ions in this way, but the method is particularly impressive when used with doubly charged ions. If electrospray ionization is applied to peptides, the doubly charged ions are generally also the most commonly occurring. Electrospray ionization is a method of ionization which is used particularly frequently for biomolecules for the purpose of mass spectrometric analysis in Fourier transform mass spectrometers (FT-MS).

Recent findings have shown that a fragmentation similar to ECD occurs when multiply charged positive ions of biopolymers react with negatively charged ions of low electron affinity, for example with negative ions of Fluoranthene, transferring an electron. Negative radical cations are particularly favorable. Fragmentation by electron transfer is very similar to fragmentation by electron capture. "Electron transfer dissociation" is abbreviated to ETD.

In the case of multiply charged positive ions, reactions between multiply charged positive ions and negatively charged ions can also be used for extensive charge stripping.

This is achieved by using negative ions with high electron affinity which do not generate any fragment ions. It is therefore possible to use "charge stripping" to transfer multiply charged protein ion mixtures with broad charge distribution into a mixture which consists almost entirely of singly charged ions. This mixture of singly charged ions can be very easily analyzed in simple mass spectrometers without having to have a complicated charge deconvolution of the mass spectrum obtained.

Ion guides designed as multipole rod systems are usually operated with a two-phase RF voltage, the two phases being applied in turn across the pole rods. The RF voltage across the rods of the rod system is usually not very high. In the case of commercial ion guide systems it is only a few hundred volts at a frequency of several megahertz. In the interior, a multipole field is generated which oscillates with the RF voltage and drives ions above a threshold mass to the central axis, causing them to execute so-called secular oscillations in this field. The restoring forces in the ion trap are sometimes described using a so-called pseudopotential, which is determined via a temporal averaging of the forces of the real potential. In the central axis is a saddle point of the oscillating real potential; this decreases, according to the phase of the RF voltage, from the saddle point to the rod electrodes of the one phase and increases towards the other rod electrodes. The saddle point itself is usually at a DC voltage potential.

These ion guides can be used to transport the ions, and also especially as collision cells to fragment the ions, or as cooling cells for damping the oscillations of the ions. They are normally filled with collision or deceleration gas; after losing part of their kinetic energy the ions then collect in the axis of the system under the influence of the pseudopotential.

Ion guides have also been developed which have a weak DC voltage drop along the axis, thus driving the ions to one end of the ion guide; they especially include ion guides which are not designed as multipole rod systems. Ion guides can also consist of wire pairs coiled in the form of a double helix or quadruple helix, the wire pairs being charged with RF voltages. DC voltage drops across the wire pairs lead to a DC voltage drop in the axis of the system and hence to the ions being driven forward. Ion guides can also consist of a large number of coaxially arranged apertured diaphragms connected alternately to the two phases of an RF voltage. Here, also, it is possible to generate a DC voltage drop along the axis, as already described in the patent prepublication DE 195 23 859 A1 and the equivalent U.S. Pat. No. 5,572,035.

A popular way of ionizing large biomolecules is to use electrospray ionization (ESI), which ionizes the biomolecules out of solutions at atmospheric pressure outside the mass spectrometer. These ions are then introduced into the vacuum of the mass spectrometer by means of inlet systems of a known type. This ionization produces practically no fragment ions, but essentially only ions of the unfragmented molecules, which arise by the attachment of one or more protons to the molecule. The attached protons mean that the mass of these ions no longer corresponds to the mass of the molecules, and so they are frequently termed "quasi-molecule ions". During electrospray ionization, multiple protonation frequently leads to multiply charged ions of the molecules, depending on the size of the ions. In the case of peptides in the range 800 to 3000 Dalton, doubly protonated ions predominate; with larger molecules, ions with three or more protons prevail. The lack of almost any fragmentation during the ionization process limits the information from the mass spectrum to the molecular weight; there is no information concerning internal molecular structures which can be used for further identification of the substances present. This information can only be obtained by acquiring fragment ion spectra (daughter ion spectra).

Various types of mass analyzers are suitable for analyzing the ions, particularly for analyzing the ion reaction products from positive and negative ions. Time-of-flight mass analyzers with orthogonal ion injection have proven to be outstanding, however.

Time-of-flight mass spectrometers with orthogonal ion injection (OTOF for short) are characterized by a high precision of their mass determination and by a high duty cycle using most of the ions supplied. They operate with a continuous ion beam and normally acquire between 10,000 and 20,000 spectra per second, which can be added to form sum spectra in real time. If one adds only 1,000 spectra over a twentieth of a second, then the mass spectrometer with 20 sum spectra per second can also follow the most rapid chromatographic or electrophoretic separation processes, as are to be expected for chip-based separators. Adding over a longer period increases the dynamic range of measurement. This type of mass spectrometer can be manufactured at moderate cost and is extraordinarily flexible in its application, something which no other mass spectrometer has so far managed to achieve.

If these time-of-flight mass spectrometers are set up as tandem mass spectrometers to scan daughter ion spectra, they have, until now, carried out the fragmentation of selected parent ions to daughter ions using collisions in gas-filled collision cells. The parent ions are usually selected using upstream quadrupole mass filters; RF ion guides are used as collision cells for the fragmentation. The fragment ions obtained as a result of collisions are then injected into the time-of-flight mass analyzer and measured as a daughter ion spectrum.

SUMMARY OF THE INVENTION

The invention involves an RF-operated ion guide with a side inlet, particularly suitable for reactions between positive and negative ion species, one ion species being fed in through the side inlet. Particularly favorable is an ion guide made up of a set of coaxial apertured diaphragms with a slight axial DC potential gradient. The reactions can be used for a fragmentation of doubly or triply charged protein or peptide ions by electron transfer, or for the removal of excess charges of multiply charged biopolymer ions, for example.

The invention provides a reaction cell for reactions between analyte ions and reactant ions, the reaction cell comprising an RF ion guide for the passage of one ion species, with a side inlet system to feed in the other ion species, the side inlet system preferably also being constructed as an RF ion guide.

For this reaction cell it is possible to construct both the direct RF ion guide and also the side inlet system as multipole rod systems, such as a straight octopole rod system with a hexapole rod system leading in laterally, for example. Similarly, the system could use a quadrupole rod system into which a second quadrupole rod system merges at 45°.

Particularly favorable is a system in which the straight linear RF ion guide consists of coaxial apertured diaphragms, and the side inlet system is constructed as a hexapole rod system. The hexapole rod system of the side inlet meshes into notches made in the apertured diaphragms so as to make contact and uses their RF potentials. As it is very simple to set up a weak potential gradient along the axis in a system such as this, which comprises individual apertured diaphragms, the positive ions introduced in a first direction flow towards the negative ions, which are introduced via the hexapole rod system. The coaxial apertured diaphragms can all have the same inside diameter, as is the case in ion guides or collision cells; the inside diameters of the coaxial apertured diaphragms can also have a tapered or trumpet-shaped profile, as is the case with ion funnels. As is known, ion funnels of this type are frequently used at the entrance of a mass spectrometer in order to largely remove the ambient gas which flows into the vacuum system of the mass spectrometer with externally generated ions.

However, the continuous ion guide can also be a double helix supplied with RF voltage, into which a quadrupole or hexapole rod system leads. As is the case with the ring systems, a DC voltage drop can also be created along the axis of the corresponding system for the double helix, as already described in U.S. Pat. No. 5,572,035. With this DC voltage drop, positive and negative ions flow towards each other in this case as well.

A collision gas has a particularly favorable effect for the reactions in ion guides with weak potential gradients in the axis, as it collects both the positive as well as the negative ions in the axis of the straight ion guide and ensures that the ions flow slowly in the opposite direction. The reaction probability is increased because favorable conditions exist for reactions between positive and negative ions.

However, the invention also includes a mass spectrometer to acquire spectra of the reaction products from reactions of analyte ions and reactant ions with different charges. For this, the mass spectrometer must comprise at least the following parts: (a) an ion source to generate the analyte ions, (b) an ion source to generate the reactant ions, (c) a reaction cell according to the invention with side inlet for the reactant ions and (c) a mass analyzer to acquire the mass spectra of the reaction products. The mass spectrometer may favorably be a time-of-flight mass spectrometer with orthogonal ion injection.

The reactant ions are favorably created in a cell for chemical ionization. These cells usually operate at a pressure of around $1\times10^2$–$5\times10^2$ Pascal. Such a pressure is normally to be found at the entrance of the mass spectrometer after the inlet capillary for externally-generated ions, so that this is a favorable location for an ion source of this type. It is possible to form both positive and negative ions with chemical ionization. With the help of electrons from a thermion cathode, negative reactant ions can be generated from a substance fed in through a capillary via a series of intermediate steps.

An alternative way of generating negative ions is ionization by electron capture. It is particularly simple to produce the electron capture in a suitable cell using a cluster of electrons, which in turn are generated by an alpha emitter in a collision gas such as nitrogen.

It should be possible to switch the supply of reactant ions into the reaction cell on and off, for example by means of a diaphragm system, in order that the spectra can be acquired with and without reactions.

The generation of the analyte ions, usually positive ions, is best done by an electrospray ion source. In such cases, the analyte substance for generating the analyte ions is usually added to the spray liquid in the spray capillary; but the analyte substances can also be added to the spray mist by laser ablation from solid samples of a sample support plate.

BRIEF DESCRIPTION OF THE INVENTION

FIG. 1 shows a reaction cell according to this invention which is constructed as an octopole rod system with a hexapole rod system leading laterally into it.

Figure 2:
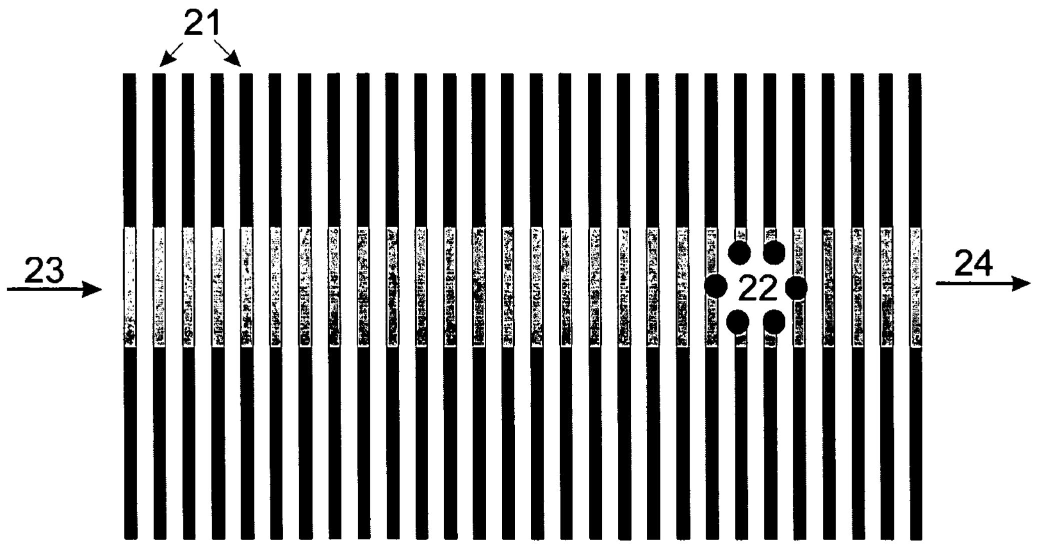

FIG. 2 illustrates an ion guide made of parallel ring diaphragms (21) with constant inside diameters as the reaction cell, with a hexapole rod system (22) leading laterally into it, this system being only visible here as an end view. The hexapole rod system (22) is connected with a number of ring diaphragms (21) of the ion guide in such a way that the RF voltage for the system of ring diaphragms also supplies the hexapole rod system. The system of ring diaphragms can also have a DC voltage drop along the axis.

Figure 3:
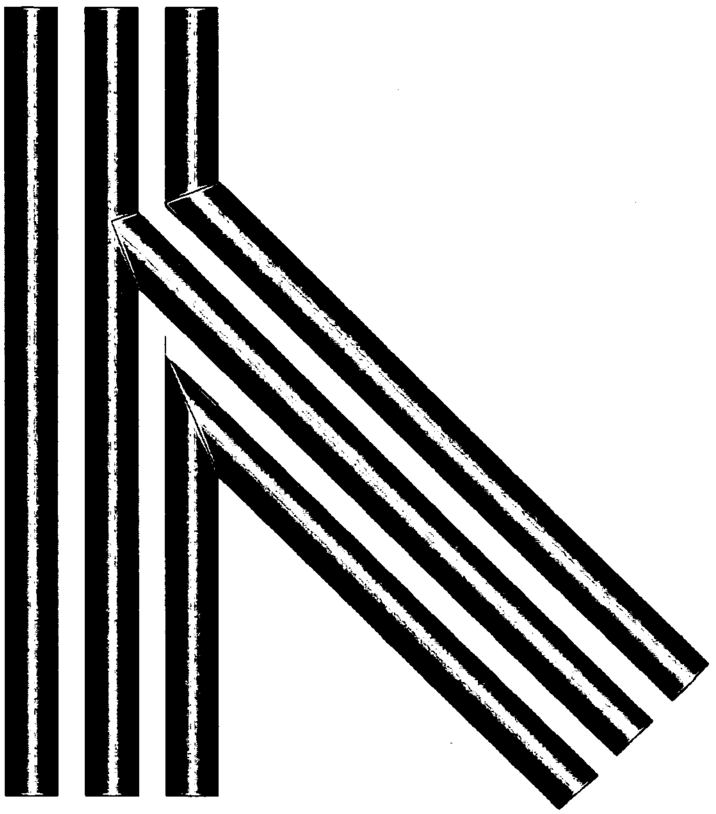

FIG. 3 shows the plan view of a feed-in quadrupole rod system which leads into the side of a straight quadrupole rod system at an angle.

Figure 4:
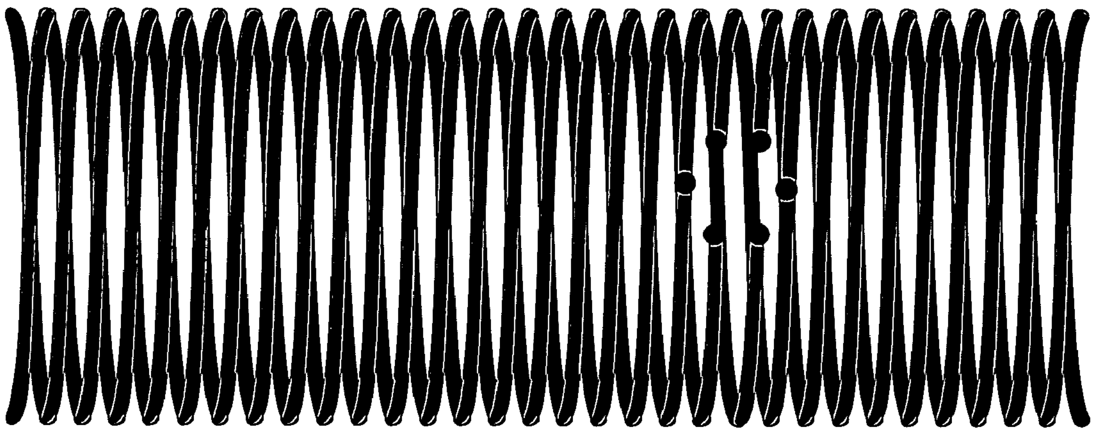

In FIG. 4, a hexapole rod system leads into an ion guide consisting of a double helix made of wire pairs. The hexapole rod system is only visible as an end view. Here, as well, the hexapole rod system is operated by the two-phase RF voltage across the double helix.

Figure 5:
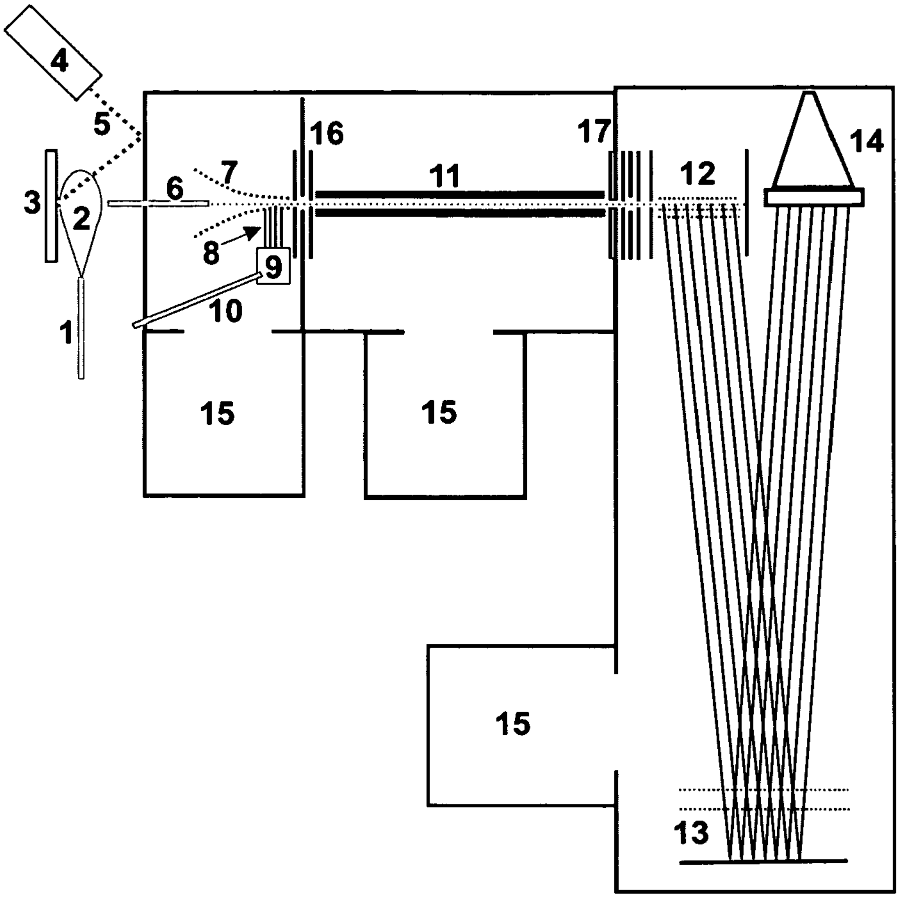

FIG. 5 shows a schematic representation of a mass spectrometer according to this invention, in which the ions generated in the spray cone (2) are introduced together with ambient gas through the capillary (6) into an ion funnel (7) made up of coaxial ring diaphragms. Reactant ions from an ion source (9) for chemical ionization are fed to the trumpet-shaped ion funnel (7) via a hexapole rod system (8); the trumpet-shaped ion funnel (7) also serves as a reaction cell here. The trumpet-shaped ion funnel (7) can have a weak DC voltage drop along its axis (not shown here), which allows the positive ions to drift towards the narrow end; at the same time the negative ions drift towards the wide end.

Figure 6:
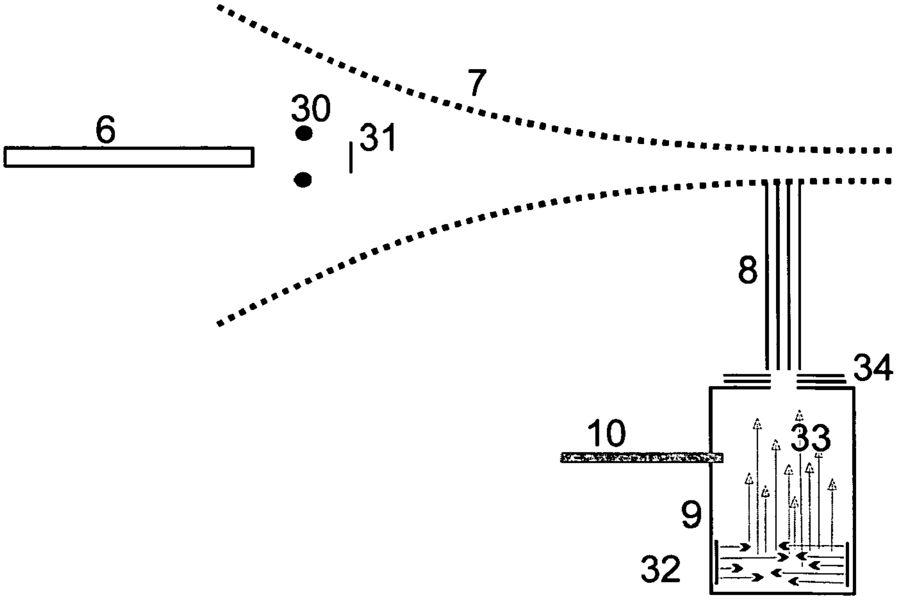

FIG. 6 shows a detailed schematic representation of the generation of negative reactant ions in an ion source (9) and their introduction into the trumpet-shaped ion funnel (7) via a hexapole rod system (8). The negative reactant ions are generated by capturing electrons (33) which are generated as a strong cluster by an alpha emitter (32).

DETAILED DESCRIPTION

There are several favorable embodiments for the reaction cell. Particularly favorable are reaction cells in which the negative and positive ions, collected in the axis by a collision gas, flow towards each other in a narrow channel. This can be achieved by a weak axial DC voltage gradient in an ion guide filled with collision gas. Ion guides in which an axial DC voltage gradient can easily be set up include ion guides made up of wire pairs coiled in the shape of a double helix, and especially ion guides made up of a set of coaxially arranged apertured diaphragms, across which the two phases of the RF voltage are applied alternately. In the case of the wire pairs coiled in the shape of a double helix it is easy to achieve a voltage drop along the wires, especially if resistance material is used for the wires. With the coaxially arranged apertured diaphragms, a configuration with resistors and capacitors can be organized in such a way that a DC voltage gradient occurs in addition to the RF connection.

A favorable mode consists in guiding positive ions of the analyte substance through the ion guide and allowing the negative ions of the reactant substance to flow towards them (or vice versa, which will not be discussed further here). This requires that the negative ions be introduced into the reaction cell without disturbing the transmission of the positive ions.

According to the invention, one of the ion species is fed in from the side, preferably by means of ion-guiding RF rod systems which lead laterally into the ion guide, where they are in contact with the electrodes of the ion guide, and from where they are supplied with RF voltage. This means that the electrodes of the straight ion guide have to be interrupted over a short distance. If a quadrupole rod system is connected, it is only necessary to interrupt one electrode of the continuous ion guide; two T-shaped connections to the neighboring electrodes are also required. To connect a hexapole rod system, two electrodes have to be interrupted, and two T-connections to neighboring electrodes are also necessary. An octopole rod system requires three interruptions and two T-connections. It is irrelevant here whether the electrodes of the continuous ion guide consist of a rod system, a double or quadruple helix or a system of ring diaphragms.

For ion reactions, the lateral feed into the straight ion guide must be supplied with ions, to be precise, with ions of opposite polarity to those contained in the continuous ion guide. It is preferable if these laterally introduced ions are created in separate ion sources. This can occur in ion sources for chemical ionization, for example. These can produce both positive and negative ions. Ion sources for chemical ionization operate best at pressures of several hundred Pascal. As such a pressure is to be found in the first pump stage of the vacuum system after the capillary inlet, these ion sources are particularly good for being installed here.

The specialist is aware of the ion sources for chemical ionization and they do not need to be specially described here. Apart from chemical ionization, electron capture is another way of forming negative ions.

FIG. 6 illustrates such an ion source (9) for the production of negative reactant ions by electron capture in detail. The reactant substances for the production of negative reactant ions are fed in via a capillary (10). These substances are ionized in this case by a cluster (33) of electrons by electron capture. The cluster of electrons is created from the collision gas in the ion source by bombardment with alpha particles from a radioactive foil (32). The collision gas is admitted together with the substance through the capillary (10). The ions formed and the excess electrons are evacuated through the lens system (34) and introduced into the hexapole rod system (8), from which the electrons escape immediately. The negative ions are trapped and conveyed on. The gas dynamics of the excess collision gas, which is introduced via the capillary (10) together with the reactant substance, blows the negative reactant ions through the hexapole rod system (8) into the ion funnel (7), where they drift diffusely towards the positive analyte ions and can react with them.

The reactions of positive ions with negative ions can belong to very different classes. For example, (a) chemical reactions between the ions are possible, (b) charge reductions in the case of multiply protonated ions and (c) fragmentations of multiply charged positive ions by electron transfer (“electron transfer dissociation” ETD). All these reactions can be carried out in a reaction cell according to the invention, and their products can be analyzed in a mass spectrometer according to the invention.

A favorable embodiment of a mass spectrometer according to the invention is schematically represented in FIG. 5 and shows an electrospray ion source with spray capillary (1) and spray cloud (2), also an inlet capillary (6) which transfers the analyte ions from the spray cloud together with ambient gas into the vacuum system of the mass spectrometer, an ion funnel (7) to separate off the excess ambient gas, and an ion source (9) for negative reactant ions, which can be fed to the ion funnel (7) via the hexapole rod system (8). The ion funnel (7) serves as a reaction cell for the reactions of positive analyte ions from the spray cloud (2) with negative reactant ions from the ion source (9). A suitable configuration should create a weak potential gradient along the axis. The product ions are introduced through the lens system (16) into a further ion guide (11). The ion guide (11) directs the product ions of the reaction through a further lens system (17) to the time-of-flight mass analyzer with pulser (12), reflector (13) and detector (14). Every specialist knows how a time-of-flight mass analyzer functions and there is no need to describe it further here.

The electrospray ion source (1, 2) is widely used in commercial mass spectrometers and also needs no further explanation here. However, the electrospray ion source here also incorporates a means by which solid samples, in which analyte molecules are prepared in a decomposable matrix on a sample support plate (3), are transported by a laser beam (5) from a pulsed laser (4) in vaporized form into the spray cloud (2), where they can be ionized. This makes it possible to generate multiply-ionized analyte ions out of laser-desorbed samples, as are required in particular for a fragmentation of the ions by electron transfer. It is well known that the matrix-assisted laser desorption and ionization (MALDI) usually used for solid samples only provides singly charged ions, which cannot be used for some purposes, for example for electron transfer dissociations ETD.

After being admitted into the vacuum system through the inlet capillary (6), the analyte ions are freed from the entrained ambient gas (usually clean nitrogen) by an ion funnel (7). The reactions with negative reactant ions take place simultaneously here. The pumps (15) form a differential pressure stage cascade. The three stages shown here are only a schematic indication; four to five stages are used for commercial mass spectrometers of this type. The product ions from the reaction cell (7) are fed through systems of apertured diaphragms (16, 17) and the ion guide (11) to the time-of-flight mass analyzer with pulser (12), reflector (13) and detector (14). The systems of apertured diaphragms (16, 17) serve to transfer the ions between the various sections of the mass spectrometer.

In other embodiments, the reaction cell can be sited at a different location within the mass spectrometer, for example not until after a quadrupole mass filter, which filters out primary ions of a desired species and feeds them to the reaction cell. Mass filters are characterized by the fact that they only transmit ions of a single mass (more precisely: mass-to-charge ratio) or a small range of masses.

All ion guides are usually filled with damping gas, which causes both positive and negative ions to collect near the axis of the system due to the effect of the pseudopotential. The narrower the system, the more efficient the process of collection. A favorable pressure range here lies between $10^{-5}$ and $10^{-2}$ Pascal.

A special application of the mass spectrometer according to the invention results from its ability to carry out simple structural analysis of biopolymer ions by ETD fragmentation. For this purpose the mass spectrometer is connected to an efficient system for separating substances, for example a nano-HPLC. The substances which are fed in at different times are ionized in the electrospray ion source so as to be predominantly multiply charged. They react with suitable negative ions of low proton affinity, and fragmentation occurs predominantly into fragment ions of the c-type, which produce a fragment ion spectrum which is easily deciphered. By periodically switching the supply of negative ions on and off with the help of the extraction lens (34) (FIG.

6), it is possible to alternately obtain spectra with and without fragmentation. By comparing the spectra, it is possible to determine the peaks of the fragment ion spectrum which belong to the fragment ions.

The mass spectrometer can also incorporate a further means of fragmentation. FIG. 6 therefore contains not only an impact plate (31) to interrupt the jet from the capillary, but also a ring electrode (30), which enables a collision induced dissociation (CID) of the analyte ions introduced if the voltage is suitably applied. Comparing ions generated by collision induced dissociation with fragment ions generated by electron transfer provides special information concerning the structure of the ions; particularly favorable is a mode of operation in which normal spectra, CID spectra and ETD spectra alternate in a short, temporal rhythm. Special programs can read out the characteristic fragment ions from these spectral mixes.

Further uses for the mass spectrometers according to the invention consist in the analysis of substance mixtures with high molecular weights, which are usually multiply charged with high numbers of protons, with wide charge distributions, in the electrospray ion source, and thus produce a mixture of peaks in the spectrum which is almost impossible to decipher. By removing the excess charges, it is possible to generate a mixture which consists almost entirely of singly charged ions and is therefore simple to interpret. A time-of-flight mass analyzer, in particular, is suitable for scanning spectra with ions of high mass; the mass being limited only by the detector employed.

Naturally it is also possible to use other types of mass analyzers instead of the time-of-flight mass analyzer to acquire the product ion spectra. At present, however, the time-of-flight mass analyzer seems to offer the most favorable price/performance ratio for achieving a high mass accuracy, a high dynamic range of measurement, a wide mass range and a rapid and flexibly adaptable measuring time.

With knowledge of this invention it will be possible for the specialist to construct other types of mass spectrometer with a fragmentation of the ions by electron transfer reactions, where the reactions with the negative ions no longer have to take place in the mass analyzer itself, the only method known until now.

What is claimed is:

1. Reaction cell for reactions of positive with negative ions, comprising an RF ion guide for one species of ion with a lateral inlet system for the other species of ion.

2. Reaction cell according to claim 1, wherein both the RF ion guide and the lateral inlet system are constructed as multipole rod systems.

3. Reaction cell according to claim 1, wherein the RF ion guide comprises of coaxial apertured diaphragms and the lateral inlet system is constructed as a multipole rod system.

4. Reaction cell according to claim 3, wherein the coaxial apertured diaphragms all have the same inside diameter.

5. Reaction cell according to claim 3, wherein the inside diameters of the coaxial apertured diaphragms are tapered or trumpet-shaped.

6. Reaction cell according to claim 3, wherein a voltage generator and a wiring configuration not only supply the system of ring diaphragms with the two phases of an RF voltage but also generate a weak DC voltage drop in the axis-of the system of ring diaphragms.

7. Reaction cell according to claim 1, wherein the RF ion guide consists of wires coiled in the shape of a double helix and the lateral inlet system is constructed as a multipole rod system.

8. Reaction cell according to claim 1, wherein it is filled with a collision gas.

9. Mass spectrometer for scanning reaction products from reactions of analyte ions from substances under analysis with reactant ions from reaction substances, the analyte ions and reactant ions being of different ion species, positively and negatively charged, the spectrometer comprising:

(a) an ion source for generating analyte ions, (b) an ion source for generating reactant ions, (c) a reaction cell having an RE ion guide with a passage for the analyte ions and a lateral inlet for reactant ions, and (d) a mass analyzer for analyzing the reaction products.

10. Mass spectrometer according to claim 9, wherein the mass analyzer is a time-of-flight mass analyzer with orthogonal ion injection.

11. Mass spectrometer according to claim 9, wherein the reactant ions are produced in an ion source for chemical ionization.

12. Mass spectrometer according to claim 9, wherein the reactant ions from the reaction substances are generated in a cluster of electrons by electron capture, the electrons for their part being generated from a collision gas by irradiation with an alpha emitter.

13. Mass spectrometer according to claim 9, wherein the supply of reactant ions can be switched on and off.

14. Mass spectrometer according to claim 9, wherein the ion source for generating the analyte ions is an electrospray ion source.

15. Mass spectrometer according to claim 14, wherein the electrospray ion source for generating the analyte ions is equipped with means for ionizing laser- desorbed molecules of the substance under analysis.

16. Mass spectrometer according to claim 9, wherein the mass spectrometer also incorporates means for fragmentation of the analyte ions.

17. A method for mass spectrometrically analyzing analyte ions, comprising (a) generating analyte ions in a first ion source, (b) generating reactant ions in a second ion source, wherein the analyte ions and the reactant ions are different ion species with opposite charge, (c) guiding the analyte ions through an RF ion guide, (d) introducing the reactant ions via a lateral inlet into the RF ion guide, while the analyte ions are inside the RF ion guide to facilitate reaction between the analyte and the reactant ions generating reaction products, and (e) analyzing the reaction products in a mass analyzer.

* * * * *